Jan. 5, 1971 W. H. SUSTRICH ET AL Re. 27,023

METHOD AND APPARATUS FOR SAFE VOIDING OF TANKS FILLED WITH INFLAMMABLE LIQUIDS OR VAPORS

Original Filed Sept. 8, 1966 2 Sheets-Sheet 1

INVENTOR.
WILLIAM H. SUSTRICH
GUS FRANCIS

BY

Sheridan and Ross

ATTORNEYS

INVENTOR.
WILLIAM H. SUSTRICH
GUS FRANCIS
BY Sheridan and Ross
ATTORNEYS

United States Patent Office

Re. 27,023
Reissued Jan. 5, 1971

27,023

METHOD AND APPARATUS FOR SAFE VOIDING OF TANKS FILLED WITH INFLAMMABLE LIQUIDS OR VAPORS

William H. Sustrich, Salida, and Gus Francis, Denver, Colo., assignors to Francis Associates Company, Denver, Colo., a firm composed of Gus Francis and Emma L. Francis Original No. 3,339,800, dated Sept. 5, 1967, Ser. No. 578,046, Sept. 8, 1966. Application for reissue May 26, 1969, Ser. No. 835,288

Int. Cl. B67b 7/24

U.S. Cl. 222—81 20 Claims

Matter enclosed in heavy brackets [ ] appears in the original patent but forms no part of this reissue specification; matter printed in italics indicates the additions made by reissue.

*ABSTRACT OF THE DISCLOSURE*

[The invention relates to] *An* apparatus for safely and rapidly [draining] *voiding containers, such as, tanks or containers carried by aircraft, of* flammable *or deflagratable* [fluids] *materials,* [from tanks, such as fuel tanks for aircraft,] the apparatus incorporating *explosive cutter* means for cutting [with explosive cutters in the required sequence] *a* first [a drain] hole [and second] *in the wall of the container and sequentially actuating with the cut out portion for the first hole, associated apparatus operative upon actuation to augment the voiding of the tank, the associated apparatus being a second explosive cutter for cutting* an air inlet hole *in the container,* the *essential* improvement of this invention being the [supporting of a layer] *maintenance* of non-inflammable [liquid] *fluid* between [the] *any* explosive cutter *used to cut a hole in the container* and the flammable [liquid] *or deflagratable contents of the container* to prevent ignition [of the flammable liquid.] *or deflagration of the contents of the container by the high temperature products of the hole cutting operation.*

This invention relates to a method and apparatus for quickly voiding containers having therein inflammable liquids or gases; more particularly, it relates to such a method and apparatus utilizing explosively actuated cutters for voiding the container.

The invention is specifically directed to a method and apparatus for draining flammable liquids from an aircraft fuel tank or a tank or container carried underneath an aircraft wing; however, it is by no means limited to this application as it can be used for draining containers of non-inflammable or flammable liquids and gases wherever they are positioned.

There are many instances wherein hermetically sealed tanks filled with flammable liquids must be quickly emptied. For example, in situations involving aircraft required to make emergency landings, and in other emergency situations affecting aircraft, it would be highly desirable to have available a method and apparatus for voiding the fuel tanks of such aircraft in a matter of a few seconds without danger of igniting the fuel. The only practical means of accomplishing such voiding rapidly enough is by the use of an explosively actuated valve or cutter.

The use of an explosively actuated valve for rapidly voiding tanks provides a fairly workable system but it has certain inherent disadvantages. Most explosively actuated valves operate by (1) the use of a piston actuated plunger which cuts through the metal, or (2) removal of the valve plunger from its seat by an explosive or gas actuated plunger. This type of valve is usually large and bulky and cannot be used where space is at a premium.

The primary disadvantage of most all valves which use balls or plungers or mechanisms which "seat" is the possibility of leakage occurring with time. In the case of inflammable liquids, such as high octane gasoline, this can be disastrous inasmuch as leaking fuels will be ignited by sparks coming from electric motors, or other pyrogenic sources.

Another application wherein ignition of inflammable liquids upon release from their containers is disastrous is in the case of inflammable chemical warfare agents which must be hermetically sealed in tanks to eliminate the possibility of leakage.

The rapid and effective discharge of liquids from a suspended tank requires that an air hole or "breather" hole be cut in the tank as well as a liquid outlet hole, in order to provide for effective flow of fluid from the outlet hole. It is well known that in order for liquid to flow rapidly from the outlet of a container without "breathing," an air inlet hole must be provided so that the air can fill the space occupied by the liquid being discharged from the container. Accordingly, any method and apparatus providing for the effective release or discharge of liquids from a suspended tank must provide for the cutting of both an air inlet hole and a liquid outlet hole in the tank or container.

If the tank from which the liquid or gas is to be discharged is a tank for fuel or other fluid carried by aircraft, the air inlet hole on the top of the container must be cut out after the liquid outlet hole is cut in the bottom of the container. The reason for this is that if the air inlet hole on top is cut first and poisonous or corrosive liquids are being carried in the tank, these liquids will be discharged over the wings and other parts of the aircraft with resultant damage thereto, and personnel in the aircraft may suffer serious injury. Accordingly, it is necessary that the holes be cut sequentially, that is, that the liquid outlet hole in the bottom of the tank be cut before the air inlet hole in the top of the tank is cut so that all of the liquid being discharged from the tank will pass out of the liquid outlet hole in the bottom of the tank. This sequence is desirable irrespective of the location of the tank.

The apparatus for cutting the holes in the tank must be one which provides instantaneous and reliable cutting of the holes upon actuation of the cutting mechanism. It has been found that the most effective means for cutting the holes rapidly is by the use of an explosive cutting mechanism, as such mechanisms generate large forces instantaneously. If an explosive cutter is used, it is important that the cutter assembly not be shattered by the force of the explosion which effects cutting of the holes, as shattering, with consequent production of numerous fragments of metal, plastic and other material, will result in serious damage to the aircraft.

Accordingly, it is an object of this invention to provide a method and apparatus for rapidly discharging liquids from containers.

It is another object of this invention to provide apparatus for sequentially cutting a liquid outlet hole and a breathing hole in containers to be voided of liquids.

It is a further object of this invention to provide a method and apparatus for safely draining inflammable liquids from containers, and particularly, fuel tanks carried on aircraft.

The invention to its broadest sense as applied to cutting holes in containers of inflammable liquids or vapors comprises two explosively actuated cutters, adapted to be placed one on the bottom of the tank for cutting a liquid outlet hole and one on the top of the tank for cutting the air inlet hole, in combination with electrical circuitry and switching means therefor which operate to actuate the cutter for the air inlet hole only after the liquid outlet hole has been cut. To prevent ignition of the flammable liquid or the vapor by the detonation of explosive in the cutter, a layer of flame-quenching non-inflammable liquid is supported internally of each portion to be cut out and distal to each cutter so that a layer of non-inflammable liquid is supported between each cutter and the inflammable liquid. In the preferred embodiment, the holes are cut in the tank, or the tank is manufactured with the holes in it, and the holes are covered with a demountable patch plate assembly. The patch plate assembly comprises a patch plate to be attached over a hole, the patch plate carrying an adapter mounted explosive cutter and associated circuitry on one side, and a layer of non-inflammable fluid supported on the other side by a container wall. The assembly is attached over a hole with the container wall for the layer of non-inflammable fluid adjacent the liquid in the container. The patch plate for the liquid outlet hole carries means for actuating the detonating circuit of the air inlet cutter. The sequential firing means for the air hole cutter is actuated by outward movement of the section of the tank or patch plate cut out to form the liquid outlet hole.

Each explosive cutter comprises a heavy metal annulus having an arch shaped, annular groove on its bottom edge facing outwardly with an annular concave explosive charge positioned in and conforming to the groove with its concave surface facing outwardly and having a metal lining on its concave surface, and a detonation train for detonating the explosive charge.

In the preferred modification, a buffer layer of non-explosive material is positioned between the explosive charge and the bottom of the groove in the annulus, the surface of the explosive is in the form of a V, and two detonators are used for redundancy in detonating the explosive charges.

The invention will be described in conjunction with the accompanying drawings wherein like parts are represented by like numerals and in which.

Figure 1:
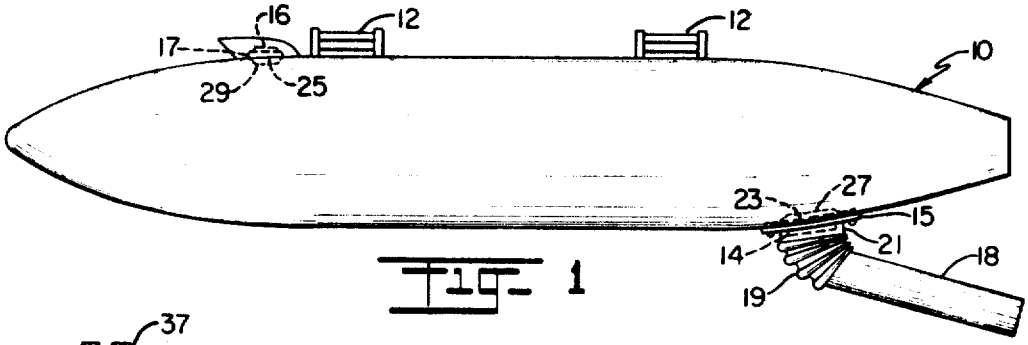
FIG. 1 is a schematic showing of a tank or container holding inflammable liquid and having patch plate assemblies attached to its upper and lower surfaces.

Referring now to FIG. 1, there is shown a tank 10 for holding inflammable liquids and adapted to be suspended from the underneath side of the wing of an aircraft by suspension lugs 12. The inflammable liquids, of course, may be poisonous, corrosive or otherwise deleterious. The tank may, of course, be the main or auxiliary fuel tank of an aircraft. Lower and upper explosive cutters 14 and 16, are schematically shown mounted on patch plates 15 and 17, respectively, for cutting liquid outlet and air inlet holes, respectively. The cutters are preferably mounted on demountable patch plates secured over holes in the tank and holes are cut in the patch plates, but the cutters can be mounted directly to the tank and holes cut in the tank.

The nozzle device 18 is connected by means of flexible elbow 19 to a mounting adapter 21 attached to patch plate 15, the adapter securing the cutter 14 to the patch plate. An adapter is not necessary for the air inlet hole patch plate assembly. The purpose of the nozzle, of course, is to control the stream of liquid leaving the tank. Layers of non-inflammable quenching liquid 23 and 25 are maintained by container walls 27 and 29, respectively on the internal surfaces of the portions of the patch plates to be cut out by cutters 14 and 16, respectively. Container areas are formed by the walls 27 and 29 and the respective adjacent surfaces of the patch plates. The assembly of patch plate, cutter and container wall with contained fluid will be referred to hereinafter as the patch plate assembly.

Figure 2:
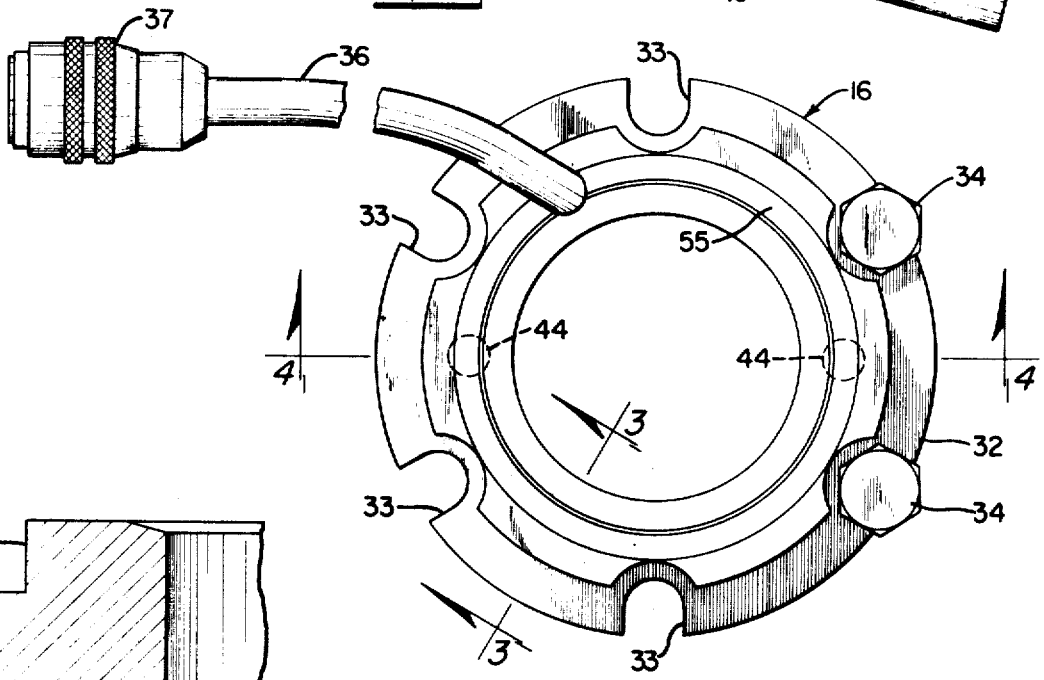
FIG. 2 is a top plan view of the patch plate assembly including the explosive cutter used on the top of the tank for cutting the air inlet hole in the tank or a patch plate.
Figure 3:
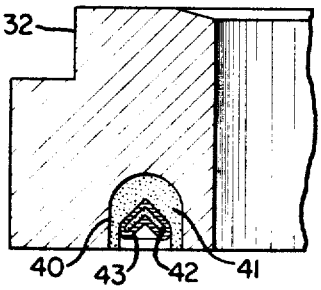
FIG. 3 is a vertical cross-section of the back-up annulus of the explosive cutter of FIG. 2 taken on line 3—3 of FIG. 2.
Figure 4:
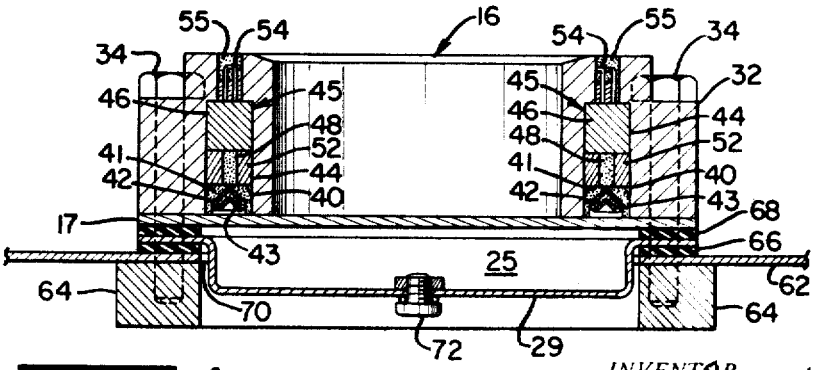
FIG. 4 is a section taken on line 4—4 of FIG. 2 looking in the direction of the arrows and showing a layer of non-inflammable quenching liquid maintained by a container wall on the internal surface of a portion of a patch plate to be cut out.

Reference will now be made to FIGS. 2, 3 and 4 for a description of the construction of the explosive cutter of the patch plate assembly for the air inlet hole. The construction of the explosive cutter for the patch plate assembly for the liquid outlet hole is of similar construction with the exception that the explosive cutting charge does not extend through 360°, and the detonators are located differently. Accordingly, a detailed description of the construction of the latter explosive cutter will not be repeated.

Referring to FIG. 2, the upper cutter 16 for cutting the air inlet hole is constructed in the form of an annulus 32 provided with slots 33 and mating screws or bolts 34 for attaching the annulus to tank 10. A cable 36 and a plug 37 are provided for electrical lead wires leading to the detonation train of the cutter 16 which will be more fully explained later. The annulus 32 must be made of strong metal, such as high strength steel, in order to provide a sufficiently strong back-up for the explosive cutting charge to prevent shattering when the explosive charge is detonated.

Referring to FIGS. 3 and 4, it will be seen that the annulus 32 is of solid cross-section and is constructed with an annular groove 40 facing outwardly toward the bottom of the annulus. The groove 40 extends entirely around the annulus in this modification. The groove is arch shaped and has no square corners. This shape provides the greatest strength for the surrounding metal, and precludes points of weakness which promote shattering, such as sharp corners which would result from a groove of rectangular shape. An annular layer 41 of resin such as epoxy resin, referred to hereinafter as a buffer layer, is potted into the bottom of the groove 40. The buffer layer 41 may be of suitable non-metallic material, such as Nylon, Teflon or other suitable plastic. The upper surface of the buffer layer 41 is substantially V-shaped and V-shaped explosive cutting charge 42 inside metal casing 43 is seated in the V or buffer layer 41. The sides of the buffer layer 41 extend up around metal casing 43 of the cutting charge 42 to buffer against sideways explosive forces and to insure that the explosive forces are channeled outwardly. The explosive cutting charge 42 is in the shape of an annulus and is positioned in the groove with its concave surface facing outwardly. The ends of the casing 43 of the explosive charge 42 terminate short of the end surface of the annulus to provide the proper standoff distance.

The explosive cutting charge in the preferred modification is V-shaped and has over its concave surface an annular metal liner 43. As is well known, the effect of the V-shaped cavity is to concentrate the force of the explosion and localize its effect. When the V-shaped cavity is lined or covered with a layer of metal the explosion acts to transmit jets of molten metal together with jets of gas from the explosion of the charge so that the object to be cut is subjected to concentrated jets of both metal and gas. The explosive used may be TNT, Amatol, RDX and similar explosive. The metal used for the metal casing 43 over the explosive charge 42 is preferably lead as it can be readily formed into an annulus; however, it is not limited to lead.

The cutting charge of V-shaped annulus of explosive covered with the metal sheath of casing 43 is made by filling a lead cylinder with explosive, sealing it at both ends and rolling the filled cylinder on a V-shaped die progressively until the desired shape is attained and until the required amount of explosive per unit length is obtained. This is conventional practice.

The buffer element 41 plays an important part in the operation of the cutter as it insures reliability in the operation of the device and aids materially in controlling the detonation of the explosive cutting charge 42. It serves to buffer the force of the explosion of the explosive cutting charge and prevent shattering of the back-up annulus.

Seated in wells 44 of the groove 40, 180° apart in this modification, are the detonation trains 45 comprised of detonator 46 of lower order explosive and lead-in explosive charge 48 of a higher order explosive. The explosive of the detonator may be lead azide or similar explosive and that of the lead-in charge 48 may be PETN, RDX, or other type higher order explosive. The purpose of the detonation train is, of course, to build up a detonation wave to detonate the explosive cutting charge. The lead-in explosive charge 48 may be dispensed with if desired and the detonator 46 used alone combining into the detonator both the lower and higher order explosives referred to earlier. The explosive charge 48 is seated in metal sleeve 52. Lead wires 54 are potted in the annulus 32 with plastic 55 as shown to conduct an electrical charge to the detonator 46.

As shown in FIG. 4, the patch plate assembly for the air inlet hole comprises the explosive cutter 16, the patch plate 17, and the container wall 29. The patch plate 17 can be welded to the container wall 29 and gasket 68 eliminated, and the annulus 32 may be secured to the other side of the patch plate. The assembly is bolted to the tank wall 62 by means of threaded bolts 34 which are screwed into circular boss 64 of tank wall 62. Circular gaskets 66 and 68 are inserted between the rim of the container wall 28 and the tank wall 62 and patch plate 17, respectively. As will be seen, the bolts 34 join together the patch plate assembly of cutter 16, patch plate 17 and container wall 29, and hold these elements assembled over the air inlet hole 70 of the tank to be voided.

The patch plate 17 may be made of the same or similar material as that of the tank to be voided and has a greater diameter than the hole to be cut out. The container wall 29 may be made of suitable material, such as, thin metal or plastic. A score pattern, not shown, is made on its internal surface to make it more readily rupturable. The container wall 29 forms with the adjacent surface of patch plate 17 a container for non-inflammable fluids which are introduced into the formed container through filling plug 72 with the aid of a suitable air inlet plug not shown. The patch plate assembly is fastened together by adhesive before attachment to the tank wall. By the described assembly a layer of non-inflammable fluid 25 is supported by means of container wall 29 on the internal surface of the portion of the patch plate 17 to be cut out, and forms a complete protective layer between explosive cutter 16 and the flammable liquid or vapor in the tank 10 to be voided.

The use of patch plate assemblies may, of course, be dispensed with for both air inlet and liquid outlet cutters. In this application the tank may be constructed with layers of non-inflammable liquid supported inside the tank wall at areas to be cut out and the cutters attached directly to the outside of the tank wall adjacent there areas by conventional fastening means.

The non-inflammable liquid 25 may be liquid carbon dioxide, carbon tetrachloride or other non-inflammable liquid which will serve to cool particles from the explosive cutter and quench any flames. As shown, the diameter of the volume of the non-inflammable liquid is greater than the diameter of the explosive cutter. This is to provide for a sufficient blanket of non-inflammable liquid to provide the desired cooling and quenching effect.

As stated above, there is a slight difference between the construction of the explosive cutter 14 for the patch plate assembly for the lower liquid outlet hole and the explosive cutter for the upper or air inlet hole. This difference will now be described with reference to FIG. 5. The front of the annulus 76 of the explosive cutter is shown in this figure having a circular groove 78 in which is seated the explosive element incased in metal sheath 80. The explosive charge does not extend completely through 360° and the detonators 82 are located at the ends of the explosive charge so that the explosive cutting charge 84 is end initiated. This construction, with the explosive cutting charge not extending through 360°, results in the cutting of an arc in the patch plate or tank surface which does not extend through 360° so that the cut out portion takes the form of a lid with a hinge on it when the explosive cutting charge is actuated. This same construction may be used for the air inlet cutter also.

Figure 6:
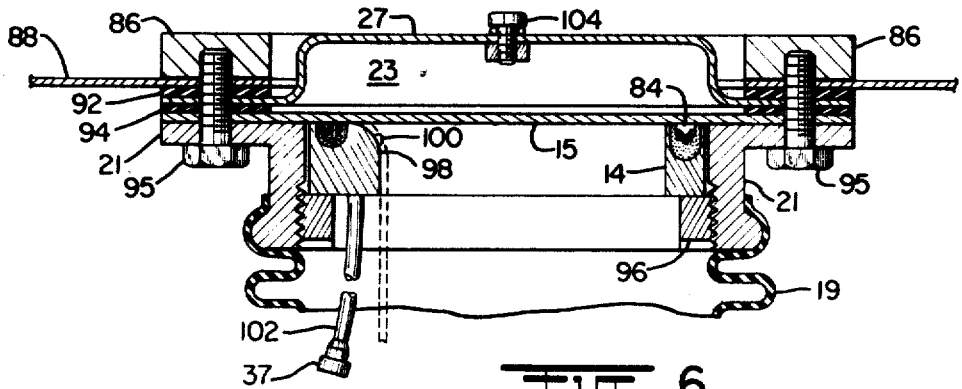
FIG. 6 is a horizontal cross-section of the patch plate assembly for the liquid outlet cutter showing it mounted on a fuel tank.

Referring now to FIG. 6, the patch plate assembly for the lower or liquid outlet hole will be described. The patch plate assembly for the liquid outlet hole as shown in FIG. 6 comprises the patch plate 15 having mounted on one side thereof container wall 27 and on the other side thereof adapter 21 supporting explosive cutter 14. The adapter 21, patch plate 15, and container wall 27 are secured to circular boss 86 of tank wall 88 by means of threaded bolts. Circular gaskets 92 and 94 are inserted between the rim of circular container wall 27 and tank wall 88 and patch plate 15, respectively. By the construction described the patch plate assembly is held together and secured to boss 86 by bolts 95. This adapter assembly and arrangement may also be used for the air inlet center.

Figure 5:
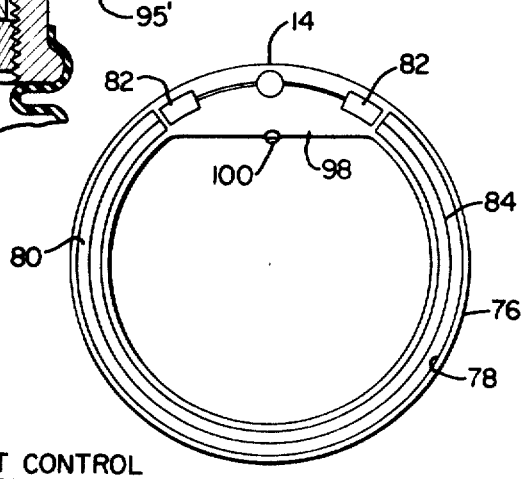
FIG. 5 is a front elevation of the annulus or housing of the explosive cutter of the patch plate assembly for the lower or liquid outlet.

Explosive cutter 14 is held in place against patch plate 15 by means of threaded adapter nut 96. A roll bar 98 of metal is welded to the interior of the annulus of cutter 14 to occupy a chord-like space therein as shown in FIGS. 5 and 6. The position of this roll for bar corresponds to the position of the space between the ends of the explosive charge 84 so that the cut out portion of the patch plate 15 will be bent around the roll bar closely contacting the face thereof as shown by dotted lines in FIG. 6. This roll bar construction may also be used for the air inlet cutter. Since this construction would be analogous to that of the outlet cutter it is not illustrated. The roll bar provides for uniformity and reproducibility of cutting, insuring that the cut out portion will remain attached by a hinge and that tears will be made along the edges of the hinge portion in the direction of the center of the cut out portion.

Figure 8:
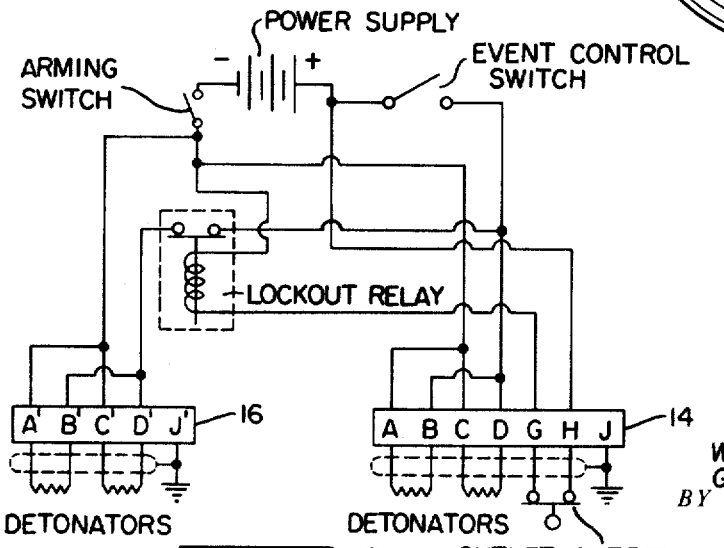
FIG. 8 is a simplified schematic diagram of the circuitry for sequentially actuating the detonation trains of the explosive cutters.

The switch button 100 is seated in the roll bar and is incorporated in the circuit as shown in FIG. 8 for actuating the detonators 46 of the explosive cutter for the air inlet hole. Circuit elements are led into the roll bar to be connected to switch 100 by means of electrical leads 102. Electrical lead wires (not shown) are also lead into the cutter through electrical leads 102 for the purpose of activating the detonators 82 of the explosive cutter 14.

Patch plate 15 is of similar construction as that of patch plate 17 for the air inlet cutter and may also be secured to container wall 27 by welding and eliminating the gasket 92. It has a diameter greater than the diameter of the explosive cutter 14. The container wall 27 forms with the adjacent surface of patch plate 15 a container for non-flammable liquid. The arrangement described provides for positioning of a blanket of non-inflammable liquid 23 between the explosive cutter 14 and the flammable fuel of the tank to be voided. The non-inflammable liquid is introduced into the enclosure formed by container wall 27 by means of filling plug 104 with the aid of an air breather plug not shown.

Figure 7:
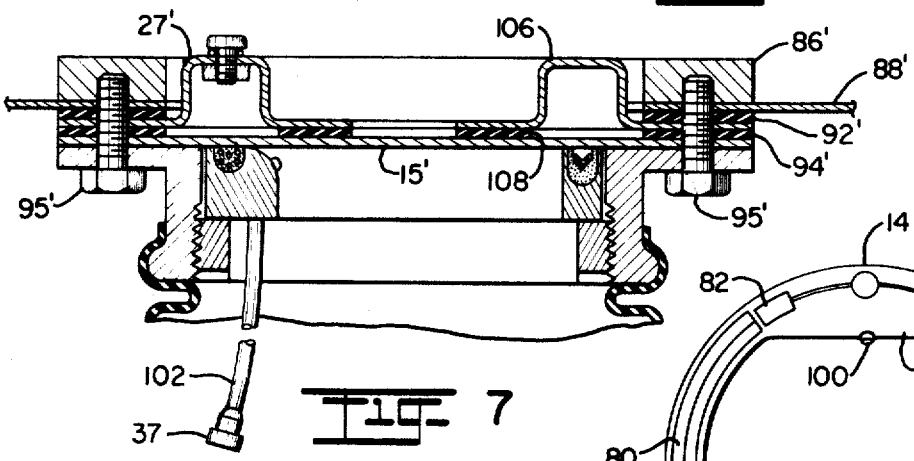
FIG. 7 is a cross-section of a modification of the patch plate assembly of FIG. 6 in which the container for the non-inflammable liquid is doughnut shaped.

A modification of the container for holding non-inflammable liquids is shown in FIG. 7. This modification is illustrated in conjunction with the patch plate assembly for the liquid outlet cutter but, of course, applies to all applications of the invention wherein a layer of non-inflammable liquid is maintained between the explosive cutter and the flammable fluid of the tank to be voided. In this modification, the wall 106 of the container for containing non-inflammable liquids is of doughnut-shape configuration as shown with an open center. The doughnut-shaped container, patch plate 15' and the gaskets 92', 94' and 108 are assembled as a patch plate assembly by cementing together all mating surfaces of the patch plate assembly. A welded together variation of the patch plate assembly would exclude gaskets 94' and 108. The patch plate assembly is attached to the tank wall 88 by means of threaded bolts 95' in the manner as that shown in the modification of FIG. 6. Other type constructions can be used to mount the doughnut-shaped container wall 106 to the patch plate. The advantage of this construction over that shown in FIG. 6 is that in the modification of FIG. 6 sections of the container wall 27 remain in front of the exit path of liquid in the tank to be voided after a hole is cut so that the flow of liquid from the tank is impeded. In the modification of FIG. 7, no sections of the container wall 106 will remain in the path of the fluid leaving the tank to be voided after the hole is cut in the patch plate, so that the fluid rapidly drains from the tank to be voided.

As shown in FIG. 8, the operation of the circuit to provide sequential activation of the explosive cutters in the two patch plate assemblies is as follows: The circuit is shown in the safe condition with button 100 in its outward position (normally closed). So long as the current flows through the sequencing switch of the liquid outlet cutter (after arming), the lockout relay will be activated to cut off the firing circuit to the air inlet cutter. When the event control switch is closed by the pilot or other personnel to admit current to the detonators of the outlet cutter and actuate the explosive cutter of the patch plate for the liquid outlet hole, switch 100 will be actuated by outward movement of the cut out portion of patch plate 15, cutting off current to the relay and thus permitting current to reach the detonators 46 of the air inlet cutter. This construction and operation insures sequential actuation of detonators 82 and 46 with the result of sequential cutting of the lower liquid outlet hole in the bottom of the tank and the upper air inlet hole in the top of the tank in that order.

The roll bar for supporting switch button 100 in the path of the cut out plate portion has been described as a preferred modification. Other means may be used for insuring that the circuit for activating the explosive of the air inlet cutter is actuated by movement of the cut out portion for the outlet hole.

In operation, the containers for non-inflammable liquid of both upper and lower patch plate assemblies are filled with non-inflammable liquid. The upper patch plate assembly for the air inlet hole, as illustrated in FIGS. 2–4, is attached over the inlet hole, followed by attachment of the patch plate assembly of FIG. 6 or 7 over the liquid outlet hole by means of threaded bolts 95 or 95'. The lead-in wires 54 through cable 36 and connector 37 for the upper explosive cutter and those for the lower explosive cutter through cable 102 and connector 37, as well as the leads for switch button 100, and other electrical connections required for the detonation of the explosive cutters, are connected into the circuitry of FIG. 8. The apparatus is then ready for operation. Upon actuation of the event control switch by the pilot or other personnel, the detonators 82 for the lower explosive cutter are actuated to initiate explosive charge 84 to cut out a portion of patch plate 15 as shown in FIG. 6. As described above, the outward movement of the cut out portion of patch plate 15 depresses button 100 which permits activation of the detonators 46 of the upper explosive cutter. The described operation insures that the detonators 46 for the upper cutter will never be actuated until a hole is cut in patch plate 15 which is over the liquid outlet hole, so that there is always a sequential cutting of the lower and upper patch plate portions in that order. In other words, the detonators 46 for the upper cutter are never actuated until the cut out portion of patch plate 15 actuates button 100. The cutters may also be sequentially actuated by timed electrical circuits or other equivalent means; however, the above described apparatus is the most dependable.

While the construction and arrangement for sequential actuation of the lower and upper explosive cutters has been described in connection with the patch plate assembly incorporating a container for non-inflammable liquid, the construction is applicable for cutting holes in tanks for voiding them of non-inflammable liquid as well. In this latter application, of course, the container for non-inflammable liquids on the front of the patch plate would be necessary. Otherwise, the construction and operation of the invention, including the explosive cutter having the end initiated explosive as illustrated in FIG. 5 and the roll bar as illustrated in FIGS. 5 and 6, is exactly the same and does not require illustration.

When the patch plate assemblies are used for voiding tanks, the tanks can be reused merely by supplying a new patch plate assembly after use. Although the invention includes voiding of tanks by attaching the sequentially operated explosive cutters directly to the outside of the tank wall and cutting holes in the tank, obviously the use of patch plates instead of this procedure has apparent advantages. If holes are cut in the tank after attaching the cutters directly to the wall of the tank rather than by means of patch plate assemblies, the tanks might be so distorted that they could not be reused.

When the annular V-shaped explosive charges of the explosive cutters are detonated with the patch plate assembly in position, the cut out portion of the patch plate will first move inwardly against the non-inflammable liquid thereby bursting the container wall for the non-inflammable liquid along scored portions thereof to result in a blanket of non-inflammable liquid enveloping the detonation products of the explosive charge and quenching and cooling any flame product, so that no flame or incandescent particles will come in contact with the flammable liquid. As the liquid is substantially non-compressible, the cut out portion of the patch plate will immediately rebound outwardly. The non-inflammable liquid forms a barrier between the detonation products and the flammable liquid inside the tank. As explained above, the described cutting sequence is necessary so that all of the liquid leaving the tank will pass through the liquid outlet hole and none will escape through the air inlet hole to cause damage to adjacent parts of an airplane wing or to personnel in an aircraft, when the invention is applied to voiding tanks carried by aircraft.

The thin stainless steel, or other metal or plastic housing or container wall for the non-inflammable liquid is scored on the face nearest the inflammable liquid or vapor so that the pressure built up by the penetration of a cutting charge will cause it to petal open immediately. This petalling eliminates the possibility of metal fragments being present in the ejected liquid stream. It also aids in controlling the flow of liquid inasmuch as the opening obtained is always uniform in configuration.

Extensive experimentation with the method and apparatus described herein has proved that they are effective for voiding tanks filled with flammable liquid or vapors without danger of igniting the fuels or vapors. The system has been tested against tanks filled with high octane gasoline with 100% success.

The reasons for the effective results of the method and apparatus of the invention are as follows. When the cutters are fired, the linear-shaped charge projects a fine high velocity stream of very hot (liquid) metal into the area directly beneath the cutter. The penetrating capability of the charge is perhaps not more than one inch of liquid after penetration of the metal plate cut out for the opening. The non-inflammable liquid quenches, cools and solidifies the projected molten metal stream and also cools and quenches all sparks generated by the cutting of the plate. The non-fragmenting housing for the linear-shaped charge is also immediately sprayed with the non-inflammable liquid and is cooled and quenched immediately after the cutting action.

As the explosively hot stream of metal strikes the non-inflammable liquid the liquid cools and solidifies the metal. The initial velocity of the jet approaches the detonation velocity of the explosive used. When striking a liquid at such velocity, the stopping effect of the liquid for all intents and purposes, is similar to that obtained when a solid of a density of the liquid is struck. For this reason, a small layer of non-inflammable liquid is very effective in acting as a shield against linear-shaped charge particles. The non-inflammable liquid has two major effects: (1) it cools all pyrogenic particles and surroundings below the temperature of the flash point of the inflammable liquid, and (2) it inhibits the penetration of the linear-shaped charged jet into the inflammable liquid. Pressure buildup in the non-inflammable liquid by the jet is transmitted directly to the main liquid body through the scored housing. Again, the shock generated is so great that the non-inflammable liquid container housing fractures along predetermined scored lines. The ability of this thin metal housing to contain the generated shock is negligible. As the liquid exerts its pressure on the cut plate it forces the plate outward. So too does the scored plate rupture and petal outward.

The invention has been described by its application to a container containing flammable liquids mounted on the wing of an airplane and by its application to fuel tanks of airplanes; however, it is not limited to these applications as it can be used in any application where sequential cutting of holes in tanks holding flammable or non-flammable liquids is required. Preferred constructions for effecting sequential cutting of holes in tanks have been disclosed; however, other equivalent means for doing this are included within the purview of the invention. The invention has been illustrated with the use of two detonators, but it is not limited to such use as one or more detonators may be used, two detonators being preferred for purposes of redundancy. The invention is not restricted to the use of non-metallic buffer 41 but the use of this element is preferred. In the claims, when the cutters are referred to as being located on the container or fuel tank, this language includes location of the cutter either on the door or patch plate or directly on the tank itself. The firing circuit shown in FIG. 8 is, of course, conventional and optional, as other conventional firing circuits may be used.

The invention includes a single explosive cutter, a single patch plate assembly, and two or more explosive cutters or patch plate assemblies in cooperative relationship, with or without adapters. It also includes the combination of one or more explosive cutters without patch plates in cooperative relationship with one or more patch plate assemblies.

It is therefore to be understood that various modifications and changes may be made in the construction and arrangement of parts of the present invention without departing from the spirit and scope thereof as defined by the appended claims. Insofar as these changes and modifications are within the purview of the annexed claims, they are to be considered a part of this invention.

What is claimed is:

1. Apparatus for rapidly voiding containers of flammable liquids by sequentially cutting holes in said containers comprising: a first explosive cutter to be located at a first position on a container for cutting out a first portion thereof; activating means for said first explosive cutter; a layer of non-inflammable liquid supported on the side of said first portion adjacent said flammable liquid and distal to said explosive cutter; a second explosive cutter to be located at a second position on said container for cutting out a second portion thereof; activating means for said second explosive cutter; a second layer of non-inflammable liquid supported on the side of said second portion adjacent said flammable liquid distal to said second explosive cutter; and actuating means for sequentially actuating said first and second explosive cutters in that order.

2. Apparatus of claim 1 in which each of said explosive cutters comprises: a heavy metal annulus having an annular groove in its bottom edge facing outwardly; an annular concave explosive charge positioned in said groove with its concave surface facing outwardly; a concave metal lining on said concave surface conforming thereto; and at least one detonation train for detonating said explosive charge.

3. The apparatus of claim 2 in which an annular backup layer of non-metallic material is positioned between the bottom of said annular groove and said explosive charge.

4. Apparatus for rapidly voiding a container holding flammable liquid comprising: in combination, a container for said flammable liquid to be supported above the ground; a first explosive cutter located on the bottom of said container for cutting out a first portion thereof; activating means for said first explosive cutter; a layer of non-inflammable liquid supported on the side of said first portion adjacent said flammable liquid and distal to said first explosive cutter; a second explosive cutter located on the top of said container for cutting out a second portion thereof; activating means for said second explosive cutter; a second layer of non-inflammable liquid supported on the side of said second portion adjacent said flammable liquid and distal to said second explosive cutter; each of said explosive cutters comprising a heavy metal annulus having as annular groove in its edge facing said container; an annular concave explosive charge postioned in said groove with its concave explosive surface facing outwardly; a concave metal lining on said concave surface conforming thereto; an annular backup layer of plastic material positioned between the bottom of said annular groove and said explosive charge; at least one detonation train in each of said explosive cutters for, respectively, detonating said explosive charges; and actuating means located adjacent said first explosive cutter operable by the movement of said first portion after it has been cut out to activate the detonation train of said second explosive cutter.

5. Apparatus for quickly voiding containers of flammable liquids by the sequential cutting of holes in the container, comprising: a first door mounted at a first position on said container; a first explosive cutter located on the outside of said first door for cutting out a first portion thereof, activating means for said first explosive cutter, a layer of non-inflammable liquid supported on the side of said first portion adjacent said flammable liquid and distal to said first explosive cutter; a second door located at a second position on said container; a second explosive cutter located on the outside of said second door for cutting out a second portion thereof; activating means for said second explosive cutter; a layer of non-inflammable liquid supported on the side of said second portion adjacent said flammable liquid and distal to said second explosive cutter; and actuating means operative upon movement of said first portion after it has been cut out to activate said second explosive cutter to cut out said second portion.

6. The apparatus of claim 5 including a circular adapter mounted over each of said portions with said explosive cutters being mounted in respective adapters.

7. The apparatus of claim 6 including a circular securing ring for each adapter for securing the explosive cutters in their respective adapters.

8. The apparatus of claim 1 in which said actuating means is normally in a first position and is operable by movement of said first portion after it has been cut out to be moved to a second position for actuating said second explosive cutter.

9. Apparatus for rapidly draining containers of flammable liquids by sequential cutting of holes in the containers comprising; in combination: a container for holding flammable liquids having a lower liquid outlet hole and an upper air inlet hole; a first door over said outlet hole; a first explosive cutter having an annulus mounted on said first door for cutting out a first portion of said first door; activating means for said first explosive cutter; a layer of non-inflammable fluid supported on the side of said first portion adjacent said flammable liquid and distal to said first explosive cutter; a second door over said air inlet hole; a second explosive cutter having an annulus mounted on said second door for cutting out a second portion thereof; activating means for said second explosive cutter; a second layer of non-inflammable liquid supported on the side of said second portion adjacent said flammable liquid and distal to said second explosive cutter; actuating means for actuating said first explosive cutter; and an actuating element in the path of travel of said first portion after it has been cut out and operative thereby to actuate said actuating means.

10. A method for rapidly voiding a container of flammable liquids which comprises; sequentially cutting holes in different areas of said container, first a liquid outlet hole and second an air inlet hole by means of explosive cutters, while maintaining a layer of non-inflammable liquid on the side of the cut out portions of said tank adjacent said flammable liquid and distal to the explosive cutters.

11. In the method of draining a flammable liquid from a container in which explosive cutters are used to sequentially cut out a first and second portion of a wall of said container to form, respectively, a liquid outlet opening and an air inlet opening, the improvement which comprises supporting on the wall of said portions to be cut out adjacent said flammable liquid and distal to said explosive cutters a layer of non-inflammable liquid as said portions are cut out by said explosive cutters.

12. An explosive cutter apparatus for rapidly voiding a container of a flammable liquid comprising: a door or patch plate; and explosive cutter attached to one side of said patch plate; and a layer of non-inflammable liquid supported on the other side of said patch plate.

13. The explosive cutter apparatus of claim 12 in which said explosive cutter comprises a heavy metal annulus having an annular groove in its edge facing said patch plate; an annular concave explosive charge positioned in said groove with its concave explosive surface facing outwardly; a concave metal lining on said concave surface conforming thereto; an annular backup layer of plastic material positioned between the bottom of said annular groove and said explosive charge; and detonation means for detonating said explosive charge.

14. The apparatus of claim 5 in which the explosive in said first explosive cutter is operative to partially cut out said first portion and leave said first portion attached to said door by a hinge, and said actuating means is actuated by the movement of said first cut out portion.

15. The apparatus of claim 14 including an actuating member located adjacent said hinge for actuation by being contacted by the surface of said cut out portion.

*16. Apparatus for cutting at least one hole in a container containing flammable or deflagratable material and actuating associated apparatus with the cut-out portion, comprising: in combination with the container, an explosive cutter including a linear explosive shaped charge positioned on the outside of the wall of said container operative to cut an outlet hole therein upon actuation of the explosive shaped charge: non-flammable fluid between said flammable or deflagratable material and said explosive cutter; and associated apparatus sequentially actuated by movement of said cut-out portion after it has been cut out.*

*17. Apparatus of claim 16 in which said explosive cutter including said linear explosive shaped charge is operative to cut out a portion of said container leaving the cut-out portion of the container attached to the container by a hinge portion.*

*18. The apparatus of claim 17 in which said explosive cutter is annular in shape, there is a space between the ends of the linear explosive shaped charge, and including means positioned adjacent said space for augmenting the formation of a hinge portion between said cut-out portion and the container.*

*19. The apparatus of claim 16 including a door or patch plate over an outlet hole in said container wtih said explosive cutter being mounted on the outside of said door or patch plate.*

*20. The apparatus of claim 16 including activating means for said associated apparatus actuated by movement of said cut-out portion after it has been cut out.*

References Cited

The following references, cited by the Examiner, are of record in the patented file of this patent or the original patent.

UNITED STATES PATENTS

| | | | |
|---|---|---|---|
| 1,007,828 | 11/1911 | Webb | 220—88X |
| 1,604,257 | 10/1926 | Brooks | 220—88X |
| 1,779,786 | 10/1930 | Unzue | 220—88X |
| 2,408,774 | 10/1946 | Goddard et al. | 222—81X |
| 2,474,826 | 7/1949 | Cantlin | 222—5X |
| 2,718,330 | 9/1955 | Adamson | 220—88 |
| 3,135,163 | 6/1954 | Mechlin, Jr., et al. | 89—5 |
| 3,169,479 | 2/1965 | Bryan | 102—24(HC) |
| 3,180,264 | 4/1965 | Webb | 102—24(HC)X |
| 3,322,294 | 5/1967 | Nemeth | 220—88X |
| 3,323,544 | 6/1967 | Francis | 137—587 |
| 1,347,057 | 7/1920 | Ross | 169—4 |
| 2,989,381 | 6/1961 | Musser | 222—5X |
| 3,191,533 | 6/1965 | Hopson | 222—5X |
| 3,335,664 | 8/1967 | Enzian | 102—24(HC)X |
| 1,793,777 | 2/1931 | Condon. | |
| 2,308,998 | 1/1943 | Misfeldt. | |
| 2,074,093 | 9/1946 | Mohaupt. | |
| 3,185,089 | 5/1965 | Parkhurst et al. | |

OTHER REFERENCES

Vasil Philipchuk: "Fabrication by Explosives," Mechanical Engineering, May 1960, pp. 48–50.

John S. Rinehart and John Pearson: "Explosive Working of Metals," Pergamon Press, New York, 1963, pp. vii–viii; 127–131, 192–199, 227–228, 279–291, 341–342.

SAMUEL F. COLEMAN, Primary Examiner

U.S. Cl. X.R.

220—88; 222—183